(12) United States Patent
Grall

(10) Patent No.: US 11,673,637 B2
(45) Date of Patent: Jun. 13, 2023

(54) SYSTEM FOR UNDERWATER EXPLORATION USING A SUBMERGED DEVICE HAVING LOCAL PRODUCTION OF ELECTRICAL ENERGY AND TOWED BY A SURFACE VESSEL

(71) Applicant: IXBLUE, Saint-Germain-en-Laye (FR)

(72) Inventor: Sébastien Grall, Saint-Germain-en-Laye (FR)

(73) Assignee: EXAIL, Saint-Germain-en-Laye (FR)

( * ) Notice: Subject to any disclaimer, the term of this patent is extended or adjusted under 35 U.S.C. 154(b) by 0 days.

(21) Appl. No.: 17/268,243

(22) PCT Filed: Aug. 12, 2019

(86) PCT No.: PCT/EP2019/071566
§ 371 (c)(1),
(2) Date: Feb. 12, 2021

(87) PCT Pub. No.: WO2020/035438
PCT Pub. Date: Feb. 20, 2020

(65) Prior Publication Data
US 2021/0309333 A1    Oct. 7, 2021

(30) Foreign Application Priority Data

Aug. 13, 2018   (FR) ........................... 1857481

(51) Int. Cl.
*B63G 8/42*    (2006.01)
*B63G 8/00*    (2006.01)
*F03B 13/10*   (2006.01)

(52) U.S. Cl.
CPC .............. *B63G 8/42* (2013.01); *B63G 8/001* (2013.01); *F03B 13/10* (2013.01);
(Continued)

(58) Field of Classification Search
CPC . B63G 8/00; B63G 8/001; B63G 8/42; B63G 2008/002; F03B 13/00;
(Continued)

(56) References Cited

U.S. PATENT DOCUMENTS 7,298,056 B2 * 11/2007 Gizara .................... F03B 17/06
114/244
2007/0046028 A1   3/2007 Gizara
(Continued)

FOREIGN PATENT DOCUMENTS

FR          2 912 818        8/2008

OTHER PUBLICATIONS

International Search Report for PCT/EP2019/071566 dated Oct. 9, 2019, 5 pages.
(Continued)

*Primary Examiner* — Lars A Olson
(74) *Attorney, Agent, or Firm* — Nixon & Vanderhye

(57) ABSTRACT

Disclosed is a system for underwater exploration using a submerged device towed by a surface vessel, the submerged device being connected to the vessel by a towing line and including equipment supplied by the electricity, characterized in that the submerged device includes at least one device for the local production of electrical energy, the device being an electric hydrogenerator and in that the towing line has no electrical supply cable connecting the vessel to the submerged device.

14 Claims, 1 Drawing Sheet

Figure 1:
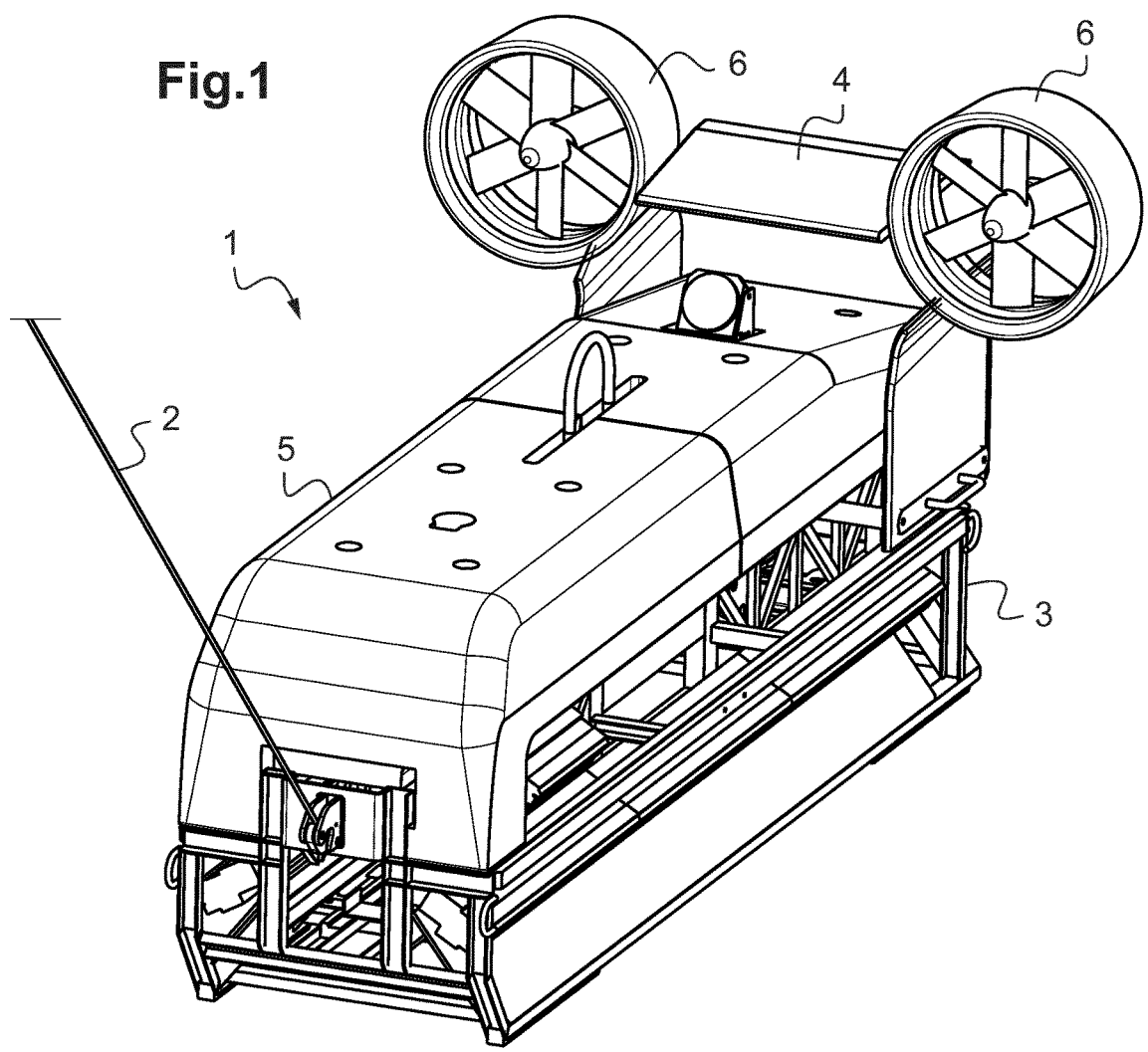

(52) U.S. Cl.
  CPC .. *B63G 2008/002* (2013.01); *F05B 2220/706* (2013.01); *F05B 2240/95* (2013.01); *F05B 2240/97* (2013.01)

(58) Field of Classification Search
  CPC ................ F03B 13/10; F05B 2220/706; F05B 2240/95; F05B 2240/97
  USPC ........................................................ 114/244
  See application file for complete search history.

(56) References Cited

U.S. PATENT DOCUMENTS

2010/0326343 A1   12/2010   Hunt
2014/0090590 A1   4/2014    Maurer et al.

OTHER PUBLICATIONS

Written Opinion of the ISA for PCT/EP2019/071566 dated Oct. 9, 2019, 5 pages.

\* cited by examiner

SYSTEM FOR UNDERWATER EXPLORATION USING A SUBMERGED DEVICE HAVING LOCAL PRODUCTION OF ELECTRICAL ENERGY AND TOWED BY A SURFACE VESSEL

CROSS-REFERENCE TO RELATED APPLICATIONS

This application is the U.S. national phase of International Application No. PCT/EP2019/071566 filed Aug. 12, 2019 which designated the U.S. and claims priority to FR 1857481 filed Aug. 13, 2018, the entire contents of each of which are hereby incorporated by reference.

TECHNICAL FIELD TO WHICH THE INVENTION RELATES

The present invention generally relates to the field of systems for underwater exploration, monitoring and measurements, as well as the field of naval defence. It more particularly relates to a system for underwater exploration using a submerged vehicle with local production of electrical energy and that is towed by a surface vessel.

TECHNOLOGICAL BACK-GROUND

It is quite usual, during sea measurement or research campaigns, to deploy a submerged vehicle that is towed by a surface vessel. The submerged vehicle, also called a fish, is towed and generally carries equipment such as sonars, sounders, multibeam sounders, sediment sounders, magnetometers and any kind of devices for collecting data at sea. Sometimes, an apparatus is used upstream from the fish carrying the equipment (i.e. on the towing vessel side with respect to the vehicle), on the towing line, to provide a better control of the trajectory of the assembly. This apparatus may be either a simple dead weight, or a depressor. The depressor uses its hydrodynamic lift to drag the towing line down and may be passive or active and, in the latter case, it changes its geometry to adjust its trajectory. This apparatus may also be a combination of a dead weight and a depressor.

The towed data collection equipment consumes electrical energy. Most of the time, this electrical energy is stored and/or produced by the towing surface vessel, and is supplied to the equipment through the towing line that combines in this case the functions of pulling/towing, electro-carrying of the power supply coming from the vessel, and, generally, also data transfer. This electro-carrying function is fulfilled by a high-current electrical cable.

It results therefrom that the towing line is heavy and bulky, and constitutes a very significant part of the drag generated by the towed assembly. In case of towing in very deep water, the towing line is even the main component of the drag.

Underwater vehicles with electric hydrogenerators are known from documents US 2014/090590 A1 and FR 2 912 818 A1.

OBJECT OF THE INVENTION

In order to remedy the above-mentioned drawbacks of the state of the art, the present invention proposes to use means for producing the electrical energy as closely as possible the place of consumption, in order to eliminate the electro-carrying function in the towing line. It is hence proposed to provide the vehicle/fish and/or the depressor and/or the dead weight with at least one electrical energy producing hydrogenerator, which is hence able to produce electric current. This production of electrical energy is obtained by using and converting the mechanical energy of the water flowing through the hydrogenerator due to the fact that the element that carries the latter is towed and moves in the water.

Hence, the invention firstly relates to a system for underwater exploration using a submerged vehicle that is towed by a surface vessel, the submerged vehicle being connected to the vessel by a towing line and comprising equipment powered by electricity.

According to the invention, the system includes at least one device for local production of electrical energy, said device being an electric hydrogenerator and the towing line having no power supply cable connecting the vessel to the submerged vehicle.

Other non-limitative and advantageously material and functional features of the system according to the invention, taken individually or according to all the technically possible combinations, are the following:
- the system includes only the submerged vehicle on the towing line,
- the system includes the submerged vehicle and a depressor on the towing line,
- the system includes the submerged vehicle and a dead weight on the towing line,
- the system includes the submerged vehicle, a depressor and a dead weight on the towing line,
- the vehicle, the depressor and the dead weight are submerged,
- the hydrogenerator is a purely electricity-producing, non-motor device,
- the hydrogenerator is reversible and is a selectable motor-generator that is able, according to the selection, to produce electricity or to consume electricity by producing a mechanical work to guide and/or propel the submerged vehicle,
- the reversible hydrogenerator is a propelling unit of the submerged vehicle,
- the submerged vehicle includes a rechargeable battery for storing the electrical energy, said battery being charged and maintained charged by the hydrogenerator,
- the towing line includes a data communication link between the vessel and the submerged vehicle,
- the towing line includes a data communication link between the vessel and the depressor,
- the towing line includes a data communication link between the vessel and the dead weight,
- the towing line includes a data communication link between the depressor and the dead weight,
- the towing line includes a data communication link between the submerged vehicle and the depressor,
- the towing line includes a data communication link between the submerged vehicle and the dead weight,
- the data communication link is chosen among electrical conductor, fibre-optic links,
- the data communication link by electrical conductor link is of the low-current type,
- the system further includes a dead weight along the towing line and the dead weight includes at least one hydrogenerator,
- the dead weight with hydrogenerator(s) supplies the submerged vehicle with electrical energy, a power supply link being extended between the dead weight and the submerged vehicle, the system further includes a depressor along the towing line and the depressor includes at least one hydrogenerator, the depressor with hydrogenerator(s) supplies the submerged vehicle with electrical energy, a power supply link being extended between the depressor and the submerged vehicle, the depressor is passive, the depressor is active and can change its geometry, the dead weight and the depressor are gathered into a single functional device, the hydrogenerator includes a propeller or a turbine, the hydrogenerator is steerable, the vessel includes a towing line winder/unwinder, the vessel and/or the depressor and/or the submerged vehicle includes guiding means that are distinct from potential propelling means, the guiding means being chosen among, notably, rudders, wings, flaps, the submerged vehicle has no proper/integrated propelling means, the depressor has no proper/integrated propelling means, the submerged vehicle includes one propelling means, the depressor includes one propelling means, the vessel includes one propelling means, the propelling means is a propelling unit that is distinct from the hydrogenerator, the propelling means is a reversible hydrogenerator, the reversible hydrogenerator is a guiding means in propelling mode, the vehicle and/or the depressor and/or the dead weight each have a vertical anteroposterior median plane and, in case a single hydrogenerator is used, the latter is arranged along said anteroposterior median plane, the vehicle and/or the depressor and/or the dead weight each have a vertical anteroposterior median plane and, in case two hydrogenerators are used, these latter are arranged laterally and symmetrically on either side of said anteroposterior median plane, the vehicle and/or the depressor and/or the dead weight each have a vertical anteroposterior median plane and, in case three hydrogenerators are used, two of these latter are arranged laterally and symmetrically on either side of said anteroposterior median plane, and the third one is arranged along said anteroposterior median plane.

The invention also proposes a submerged vehicle specifically configured for the system of the invention and that includes at least one hydrogenerator. The submerged vehicle can be made according to all the embodiments mentioned.

The invention also proposes a depressor specifically configured for the system of the invention and that includes at least one hydrogenerator. The depressor can be made according to all the embodiments mentioned.

The invention finally proposes a dead weight specifically configured for the system of the invention and that includes at least one hydrogenerator. The dead weight can be made according to all the embodiments mentioned.

The proposed solution makes it possible to avoid the use of a high-current cable in the towing line and, that way, to significantly reduce the diameter and the weight. Moreover, by eliminating the electro-carrying function of the towing line, it is possible to eliminate the rotary electrical connections of the towing line winding/unwinding winch, which are in an expensive device and are not very reliable.

On the other hand, the size of the winch on which the towing line is wound increases with the diameter of the towing line and the pulling force to be exerted. This pulling force is proportional to the drag of the towed assembly. Thanks to the elimination of the energy carrying function, the size and hence the cost of the winch, but also the bulk and weight thereof, and consequently potentially the size of the carrier vessel, can also be reduced.

DETAILED DESCRIPTION OF AN EXEMPLARY EMBODIMENT

The following description in relation with the appended drawings, given by way of non-limitative examples, will allow a good understanding of what the invention consists of and of how it can be implemented.

Figure 2:
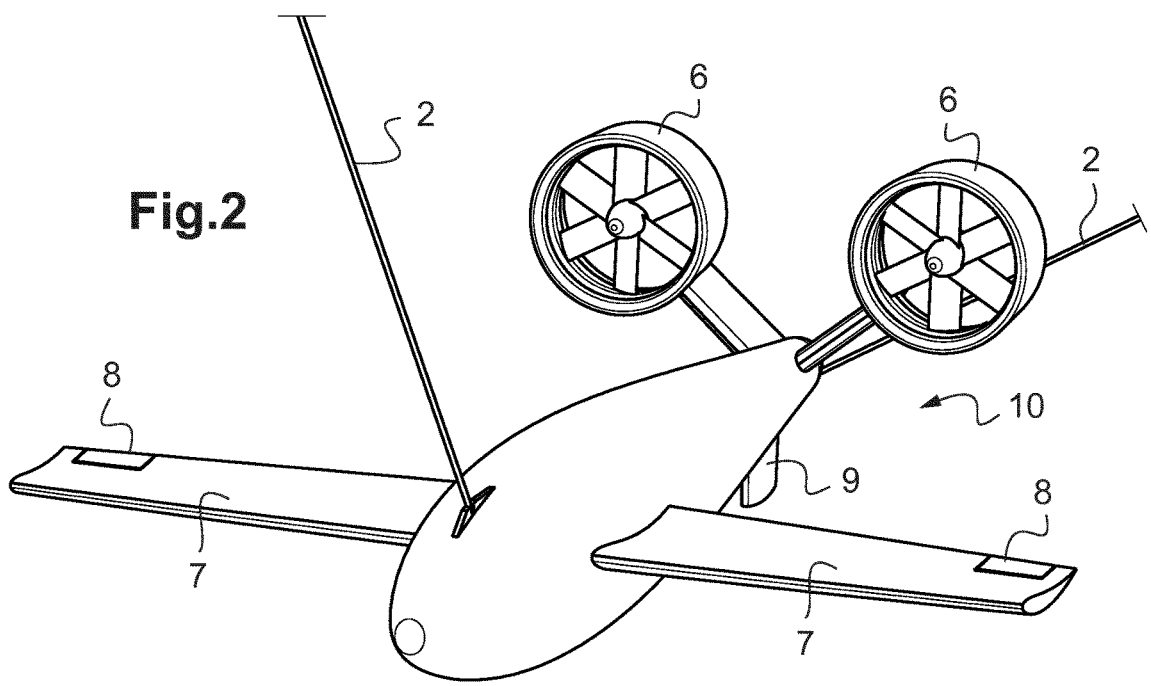

In the Appended Drawings:

FIG. 1 shows a towed, underwater submerged vehicle, including two electric hydrogenerators, and FIG. 2 shows an active depressor on a towing line, including two electric hydrogenerators.

DEVICE

FIG. 1 shows an example of underwater submerged vehicle 1 towed at the end of a towing line 2. This submerged vehicle can be brought back to the surface and on-board the towing vessel. For that purpose, the towing vessel (not shown) includes a towing line winding/unwinding winch and means for the launching and recovery of the submerged vehicle.

The submerged vehicle 1 has a chassis 3 and a hull 5, as well as guiding means such as an elevator 4 on the rear. The submerged vehicle 1 also includes two electric hydrogenerators 6 producing electrical energy that serves to power the electric equipment of the submerged vehicle. The hydrogenerators are placed around, but in other embodiments inside, the submerged vehicle so as to be able to efficiently use and convert the mechanical energy of the water flow during the towing of the submerged vehicle.

In the example shown, the hydrogenerators are equipped with blades/propellers, these two terms being considered as equivalent in the context of the invention but, in other embodiments, they may be turbines or any other equivalent means. The direction and/or the pitch of blades/propellers, or of the other means, is herein fixed but, in other embodiments, it may be variable so that the drag and/or the production of electrical energy can be adjusted. The electric generator that is connected to the blades/propellers or others is of any compatible type: alternator, dynamo . . . to produce a current that is adapted to the needs, direct, alternative, polyphase or not. Means for regulating the electric production at the hydrogenerator may be implemented, either as mentioned hereinabove at the blades/propellers, or in the generator itself, for example by acting on a magnetic field and/or inductors.

In a more advanced embodiment, the hydrogenerators are reversible and can operate as propulsion units, more to steer the submerged vehicle than to actually propel it because it is normally towed. However, this propulsion possibility can be useful in certain cases, for example in case of failure of one element of the exploration system, to bring the vehicle closer or bring it back to the vessel if the normal recovery of the submerged vehicle by towing is impossible. It is also contemplated to use a drag difference between the two hydrogenerators to create a force for rotating the submerged vehicle, one of them being for example disconnected from the production of electricity and the blades/propellers thereof being free to rotate.

FIG. 2 shows an example of depressor 10 installed on the towing line 2. This depressor 10 is active and includes a keel or a rudder 9 and wings 7 having elevators 8, these latter being steerable. The depressor 10 includes two electric hydrogenerators 6 producing electrical energy that serves to power the active means of the depressor.

The keel or rudder 9, and even the guiding means 8, can be useful in case the drags of both hydrogenerators would be different from each other, for example an object jamming one of them, in order to counter the rotational force that would result therefrom. It is also possible to use a voluntary drag difference between the hydrogenerators producing electricity to obtain a steering effect. One understands that this is possible due to the presence of two hydrogenerators, which are remote from a main plane or axis of the vehicle of depressor, this difference creating a resulting rotational force.

Like for the vehicle, in a more advanced embodiment, it is possible to implement reversible hydrogenerators, which can operate as propelling units. In the case where the hydrogenerator is reversible, in addition to the drag, the propelling effect can also be used for steering the depressor.

The invention claimed is:

1. A system for underwater exploration, comprising:
   a submerged vehicle (1) configured to be towed by a surface vessel, the submerged vehicle (1) being connectable to the vessel by a towing line (2) and comprising equipment powered by electricity,
   the submerged vehicle (1) comprising an electric hydrogenerator (6) for local production of electrical energy,
   the towing line (2) having no power supply cable connecting the vessel to the submerged vehicle, and
   the hydrogenerator (6) being reversible and comprising a selectable generator-motor that is able, according to the selection, to produce electricity or to consume electricity by producing mechanical work to guide and/or propel the submerged vehicle (1),
   the system further comprising at least one of i) a dead weight along the towing line and ii) a depressor (10) along the towing line, said at least one of the dead weight and the depressor (10) each including at least one hydrogenator (6).

2. The system according to claim 1, wherein the hydrogenerator (6) includes a propellor or a turbine.

3. The system according to claim 1, wherein the hydrogenerator (6) is steerable.

4. The system according to claim 2, wherein the hydrogenerator (6) is steerable.

5. The system according to claim 1, wherein the submerged vehicle (1) further comprises a rechargeable battery for storing the electrical energy, said battery being charged and maintained charged by the hydrogenerator (6).

6. The system according to claim 2, wherein the submerged vehicle (1) further comprises a rechargeable battery for storing the electrical energy, said battery being charged and maintained charged by the hydrogenerator (6).

7. The system according to claim 3, wherein the submerged vehicle (1) further comprises a rechargeable battery for storing the electrical energy, said battery being charged and maintained charged by the hydrogenerator (6).

8. The system according to claim 1, wherein the towing line (2) includes a data communication link between the vessel and the submerged vehicle (1).

9. The system according to claim 3, wherein the towing line (2) includes a data communication link between the vessel and the submerged vehicle (1).

10. The system according to claim 8, wherein the data communication link also includes one of an electrical conductor and fibre-optic links.

11. The system according to claim 9, wherein the data communication link also includes one of an electrical conductor and fibre-optic links.

12. The system according to claim 1, wherein the system comprises both the dead weight and the depressor, and the dead weight and the depressor are gathered into a single functional device.

13. The system according to claim 3, wherein the system comprises both the dead weight and the depressor, and the dead weight and the depressor are gathered into a single functional device.

14. The system according to claim 1, wherein the vessel includes a towing line winder/unwinder.

* * * * *